(12) United States Patent
Willgert

(10) Patent No.: US 10,054,924 B2
(45) Date of Patent: Aug. 21, 2018

(54) METHOD AND DEVICE FOR IDENTIFYING A POWER EQUIPMENT WORK PATTERN

(71) Applicant: HUSQVARNA AB, Huskvarna (SE)

(72) Inventor: Mikael Willgert, Spånga (SE)

(73) Assignee: HUSQVARNA AB, Huskvarna (SE)

( * ) Notice: Subject to any disclaimer, the term of this patent is extended or adjusted under 35 U.S.C. 154(b) by 346 days.

(21) Appl. No.: 14/763,193

(22) PCT Filed: Jan. 30, 2014

(86) PCT No.: PCT/US2014/013788
§ 371 (c)(1),
(2) Date: Jul. 24, 2015

(87) PCT Pub. No.: WO2014/120893
PCT Pub. Date: Aug. 7, 2014

(65) Prior Publication Data
US 2016/0004240 A1   Jan. 7, 2016

Related U.S. Application Data

(60) Provisional application No. 61/759,526, filed on Feb. 1, 2013.

(51) Int. Cl.
*G05B 19/042* (2006.01)
*G05B 15/02* (2006.01)
(Continued)

(52) U.S. Cl.
CPC ....... *G05B 19/0428* (2013.01); *A01D 34/008* (2013.01); *B60L 3/12* (2013.01);
(Continued)

(58) Field of Classification Search
CPC ...... G05B 19/0428; G05B 15/02; G07C 5/08; G07C 3/00; B60L 3/12; B60L 2250/10;
(Continued)

(56) References Cited

U.S. PATENT DOCUMENTS 5,528,888 A * 6/1996 Miyamoto ........... A01B 69/008
56/10.2 F
5,712,782 A   1/1998 Weigelt et al.
(Continued)

FOREIGN PATENT DOCUMENTS

CN   1659489 A   8/2005
CN   1828480 A   9/2006
(Continued)

OTHER PUBLICATIONS

International Search Report and Written Opinion for International Application No. PCT/US2014/013788 dated May 6, 2014.
(Continued)

*Primary Examiner* — Ramesh Patel
(74) *Attorney, Agent, or Firm* — McNair Law Firm, P.A.

(57) ABSTRACT

An outdoor power tool activity monitoring device is provided. The device may include processing circuitry configured for receiving indications of device activity of the outdoor power tool, determining whether the device activity correlates to a predefined work pattern, determining a set of instructions associated with the predefined work pattern in response to the device activity correlating to the predefined work pattern, and initiating provision of the set of instructions to define a programmed response to the predefined work pattern.

20 Claims, 3 Drawing Sheets

(51) Int. Cl.
*G06F 11/30* (2006.01)
*A01D 34/00* (2006.01)
*G06Q 10/00* (2012.01)
*B60L 3/12* (2006.01)
*G07C 3/00* (2006.01)
*G07C 5/08* (2006.01)

(52) U.S. Cl.
CPC .......... *G05B 15/02* (2013.01); *G06F 11/3013* (2013.01); *G06F 11/3058* (2013.01); *G06Q 10/20* (2013.01); *G07C 3/00* (2013.01); *G07C 5/08* (2013.01); B60L 2240/622 (2013.01); B60L 2240/70 (2013.01); B60L 2250/10 (2013.01); G05B 2219/2609 (2013.01); G06F 2201/81 (2013.01); Y02T 10/7291 (2013.01); Y02T 90/16 (2013.01); Y02T 90/162 (2013.01)

(58) Field of Classification Search
CPC .......... B60L 2240/70; B60L 2240/622; G06Q 10/20; A01D 34/008; G06F 11/3058; G06F 11/3013; Y02T 90/162; Y02T 10/7291; Y02T 90/16
See application file for complete search history.

(56) References Cited

U.S. PATENT DOCUMENTS

| | | | | |
|---|---|---|---|---|
| 5,938,704 | A * | 8/1999 | Torii | G05D 1/0227 180/168 |
| 7,010,425 | B2 * | 3/2006 | Gray | A01B 69/008 172/2 |
| 7,613,543 | B2 | 11/2009 | Petersson et al. | |
| 2002/156556 | A1 * | 10/2002 | Ruffner | B60G 17/0195 701/1 |
| 2003/0144774 | A1 * | 7/2003 | Trissel | A01D 34/008 701/23 |
| 2005/0015189 | A1 * | 1/2005 | Posselius | A01B 79/005 701/50 |
| 2005/0038578 | A1 * | 2/2005 | McMurtry | A01D 34/008 701/25 |
| 2008/0039974 | A1 * | 2/2008 | Sandin | G05D 1/028 700/258 |
| 2008/0183349 | A1 * | 7/2008 | Abramson | A01D 34/008 701/23 |
| 2008/0209877 | A1 * | 9/2008 | Turner | A01D 34/006 56/10.2 A |
| 2009/0228166 | A1 * | 9/2009 | Durkos | G05D 1/0219 701/26 |
| 2009/0254203 | A1 * | 10/2009 | Gerold | B25C 1/08 700/87 |
| 2010/0257743 | A1 | 10/2010 | George | |
| 2010/0275565 | A1 * | 11/2010 | Moe | A01D 75/306 56/15.9 |
| 2011/0166701 | A1 * | 7/2011 | Thacher | A01D 34/008 700/245 |
| 2012/0072322 | A1 | 3/2012 | O'Neil | |
| 2012/0277932 | A1 | 11/2012 | Anderson | |
| 2015/0234385 | A1 * | 8/2015 | Sandin | G05D 1/0265 700/258 |
| 2015/0360305 | A1 * | 12/2015 | Willgert | B23D 59/001 30/272.1 |

FOREIGN PATENT DOCUMENTS

| | | |
|---|---|---|
| CN | 101788929 A | 7/2010 |
| EP | 2946651 A1 | 11/2015 |
| JP | H0458121 A | 2/1992 |

OTHER PUBLICATIONS

International Preliminary Report on Patentability for International Application No. PCT/US2014/013788 dated Aug. 4, 2015.

* cited by examiner

METHOD AND DEVICE FOR IDENTIFYING A POWER EQUIPMENT WORK PATTERN

TECHNICAL FIELD

Example embodiments generally relate to outdoor power equipment and, more particularly, relate to outdoor power equipment that employs a work pattern identification mechanism.

BACKGROUND

Outdoor power equipment includes such devices as mowers, trimmers, edgers, chainsaws and the like. These devices are often used to perform tasks that inherently produce debris, and they are also inherently required to be mobile. Accordingly, these devices are typically made to be relatively robust and capable of handling difficult work in hostile environments, while balancing the requirement for mobility. However, these devices typically also include some form of working assembly that is capable of cutting work pieces or vegetation. Thus, these devices have the capability to be sources of risk for damage to equipment or people.

Over the years, effort an innovation has been invested in these devices to improve the safeguards provided for each respective device. Some of the safeguards employ sensors that can be triggered when specific instantaneous thresholds are exceeded. For example, some sensors may detect instantaneous accelerations that occur during operation. If an acceleration value is detected to be greater than a threshold, operation may be interrupted. However, instantaneous measurements may not be the only way or the best way to detect situations for which a shutdown may be warranted. Thus, it may be desirable to develop additional protective mechanisms that do not rely only on instantaneous measurements. Moreover, other functionalities may also be provided that are not suitable to initiation based on instantaneous measurements.

BRIEF SUMMARY OF SOME EXAMPLES

Some example embodiments may therefore provide power equipment that employs a capability for detecting work patterns. As devices are moved from location to location, they are often engaged in activities that are repeated at various ones of the locations. Thus, by studying movement of the devices and/or operational parameters thereof, it may be possible to determine specific patterns of activity associated with the devices. Some patterns may further be associated with corresponding automated actions with respect to control circuitry that may be employed locally at the equipment or remotely. The automated actions may be warnings, activity reports, protective functions, prescriptive instructions and/or the like.

In one example embodiment, an outdoor power tool activity monitoring device is provided. The device may include processing circuitry configured for receiving indications of device activity of the outdoor power tool, determining whether the device activity correlates to a predefined work pattern, determining a set of instructions associated with the predefined work pattern in response to the device activity correlating to the predefined work pattern, and initiating provision of the set of instructions to define a programmed response to the predefined work pattern.

In another example embodiment, a method of utilizing work pattern analysis in relation to operation of an outdoor power tool is provided. The method may include receiving indications of device activity of the outdoor power tool, determining whether the device activity correlates to a predefined work pattern, determining a set of instructions associated with the predefined work pattern in response to the device activity correlating to the predefined work pattern, and initiating provision of the set of instructions to define a programmed response to the predefined work pattern.

Some example embodiments may provide an operator of an outdoor power tool with a relatively easy way to expand the usefulness of the tool.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
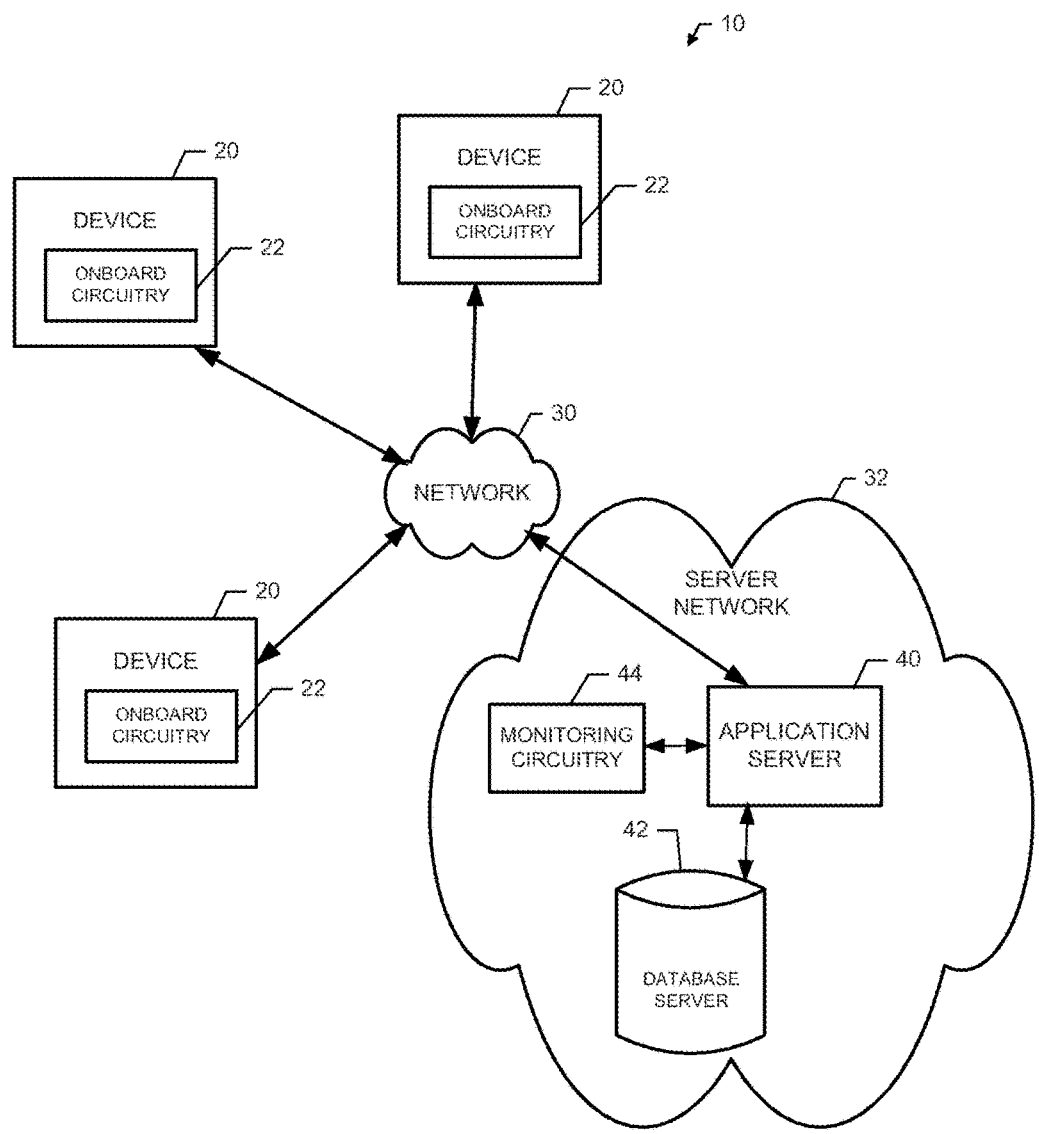
FIG. 1 illustrates a perspective view of a block diagram of a system according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein provide a work pattern monitor that may be employed on any of a number of different pieces of outdoor power equipment. The work pattern monitor may employ sensors to determine operational parameters and/or inertia based measurements associated with the use of accelerometers, gyroscopes or other similar movement detecting devices, global positioning system (GPS) devices, or local position determination schemes in order to monitor operational parameter changes and/or movement of the equipment. The parametric changes and/or movements may be recorded and/or monitored so that patterns of activity may be detected or defined. Patterns that are defined may be associated with corresponding activities such that when a particular pattern is detected in the future, the corresponding activity associated with the particular pattern may be triggered via an instruction set that is associated with the pattern.

FIG. 1 illustrates an example system in which an embodiment of the present invention may be employed. In this regard, FIG. 1 illustrates a generic example of a system in which various devices that are examples of outdoor power equipment may utilize a network for the performance of work pattern identification according to an example embodiment. As shown in FIG. 1, a system 10 according to an example embodiment may include one or more client devices (e.g., outdoor power devices 20). Notably, although FIG. 1 illustrates three devices 20, it should be appreciated that many more devices 20 may be included in some embodiments and thus, the three devices 20 of FIG. 1 are simply used to illustrate a multiplicity of devices 20 and the number of devices 20 is in no way limiting to other example embodiments. In this regard, example embodiments are scalable to inclusion of any number of devices 20 being tied into the system 10. Moreover, it should be appreciated that FIG. 1 illustrates one example embodiment in which shared resources may be allocated within a community of networked devices (e.g., devices 20). However, it should be appreciated that the architecture of various example embodiments may vary. Thus, the example of FIG. 1 is merely provided for ease of explanation of one example embodiment and should not be considered to be limiting with respect to the architecture of the system 10. Accordingly, for example, some embodiments may have specific sets of devices 20 that are associated with corresponding specific servers that belong to or are utilized by a particular organization, entity or group over a single network (e.g., network 30). However, in other embodiments, multiple different sets of devices 20 may be enabled to access other servers associated with different organizations, entities or groups via the same or a different network.

The devices 20 may, in some cases, each include sensory, computing and/or communication devices associated with different power equipment devices that belong to or are associated with an organization. For example, among the devices 20, one device may be associated with a first facility or location of a first organization. Meanwhile, a second device may be associated with a second facility or location of the first organization. As such, for example, some of the devices 20 may be associated with the first organization, while other ones of the devices 20 are associated with a second organization. Thus, for example, the devices 20 may be remotely located from each other, collocated, or combinations thereof. However, in some embodiments, each of the devices 20 may be associated with individuals, locations or entities associated with different organizations or merely representing individual devices.

Each one of the devices 20 may include a housing inside which a power unit or motor (not shown) is housed. In some embodiments, the power unit may be either an electric motor or an internal combustion engine. The devices 20 may each further include a a work assembly. The work assembly may be operated via the power unit to perform a cutting operation. Various example types of devices 20 with which example embodiments may be associated should be understood to have corresponding different types of work assemblies (e.g., blades, knives, cutting line, cutting chain, etc.).

In an example embodiment, each of the devices 20 may include onboard circuitry 22 which may include or otherwise be embodied as a computing device (e.g., a computer, access terminal, processing circuitry, or the like) capable of communication with a network 30. As such, for example, each one of the devices 20 may include (or otherwise have access to) memory for storing instructions or applications for the performance of various functions and a corresponding processor for executing stored instructions or applications and a corresponding processor or processing circuitry. Each one of the devices 20 may also include software and/or corresponding hardware (e.g., the onboard circuitry 22) for enabling the performance of the respective functions of the clients as described below. In an example embodiment, one or more of the devices 20 may be configured to execute applications or functions implemented via software for enabling a respective one of the devices 20 to communicate with the network 30 for requesting and/or receiving information and/or services via the network 30 and/or for providing data to other devices via the network 30. The information or services receivable at the devices 20 may include deliverable components (e.g., downloadable software to configure the onboard circuitry 22 of the devices 20, or information for consumption or utilization at the onboard circuitry 22 of the devices 20).

The network 30 may be a data network, such as a local area network (LAN), a metropolitan area network (MAN), a wide area network (WAN) (e.g., the Internet), and/or the like, which may couple the devices 20 to devices such as processing elements (e.g., personal computers, server computers or the like) and/or databases. Communication between the network 30, the devices 20 and the devices or databases (e.g., servers) to which the devices 20 are coupled may be accomplished by either wired or wireless communication mechanisms and corresponding communication protocols.

In an example embodiment, other devices to which the devices 20 may be coupled via the network 30 may include a server network 32 including one or more application servers (e.g., application server 40), and/or a database server 42, which together may form respective elements of the server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 may include monitoring circuitry 44 (which may be similar to or different from the onboard circuitry 22 of the devices 20) that may include hardware and/or software for configuring the application server 40 to perform various functions. As such, for example, the application server 40 may include processing logic and memory enabling the application server 40 to access and/or execute stored computer readable instructions for performing various functions.

In an example embodiment, one function that may be provided by the application server 40 (e.g., via the monitoring circuitry 44) may be the provision of services relating to work pattern identification, as will be described in greater detail below. For example, the application server 40 may be configured to receive data from the devices 20 and process the data to identify work patterns as described herein. Thus, for example, the onboard circuitry 22 may be configured to send the data to the application server 40 for the application server to identify work patterns so that identified work patterns can be acted upon (e.g., if the identified work pattern is associated with activities to be performed responsive to identification of the identified work pattern), or have actions associated therewith (e.g., if the work pattern is being identified in order to prescribe actions to be performed when the work pattern is detected in the future). In some embodiments, the application server 40 may be configured to provide devices 20 with instructions (e.g., for execution by the onboard circuitry 22) for taking prescribed actions when corresponding work patterns are identified.

Accordingly, in some example embodiments, data from devices 20 may be provided to and analyzed at the application server 40 to identify or define a work pattern (e.g., in real time or at a later time). The work pattern may be associated with actions to be taken by the corresponding one of the devices 20 that sent the data (or another device following the same work pattern) in response to a future detection of the work pattern. The application server 40 may then equip one or more of the devices 20 to detect the defined work pattern in the future, and also provide instructions for actions to be taken when the defined work pattern is encountered. Each one of the devices 20 that has received the instructions may then detect the defined work pattern and take the appropriate action.

Alternatively or additionally, data from devices 20 may be provided to and analyzed at the application server 40 (e.g., in real time) to identify or define a work pattern. The work pattern may be associated with actions to be taken by the application server 40 in response to a future detection of the work pattern. The application server 40 may then provide a report or warning or may direct action to be taken at one or more devices 20 when an occurrence of the defined work pattern is detected in the future.

In still other embodiments, the devices 20 themselves may analyze data for detection of work patterns (e.g., using the onboard circuitry 22) and define and/or take action responsive to detecting the occurrence of a defined work pattern. Thus, the devices 20 may operate in some cases independently of the network 30 and the application server 40. However, in some cases, the application server 40 may be used to provide defined work patterns to the devices 20 and the devices 20 may be configured thereafter to operate to detect work patterns and take actions correspondingly.

In some embodiments, for example, the onboard circuitry 22 and/or the monitoring circuitry 44 may include or have access to stored instructions for handling activities associated with practicing example embodiments as described herein. As such, in some embodiments, the onboard circuitry 22 and/or the monitoring circuitry 44 may include software and/or hardware for enabling the onboard circuitry 22 and/or the monitoring circuitry 44 to communicate via the network 30 for the provision and/or receipt of information associated with performing activities as described herein.

Figure 2:
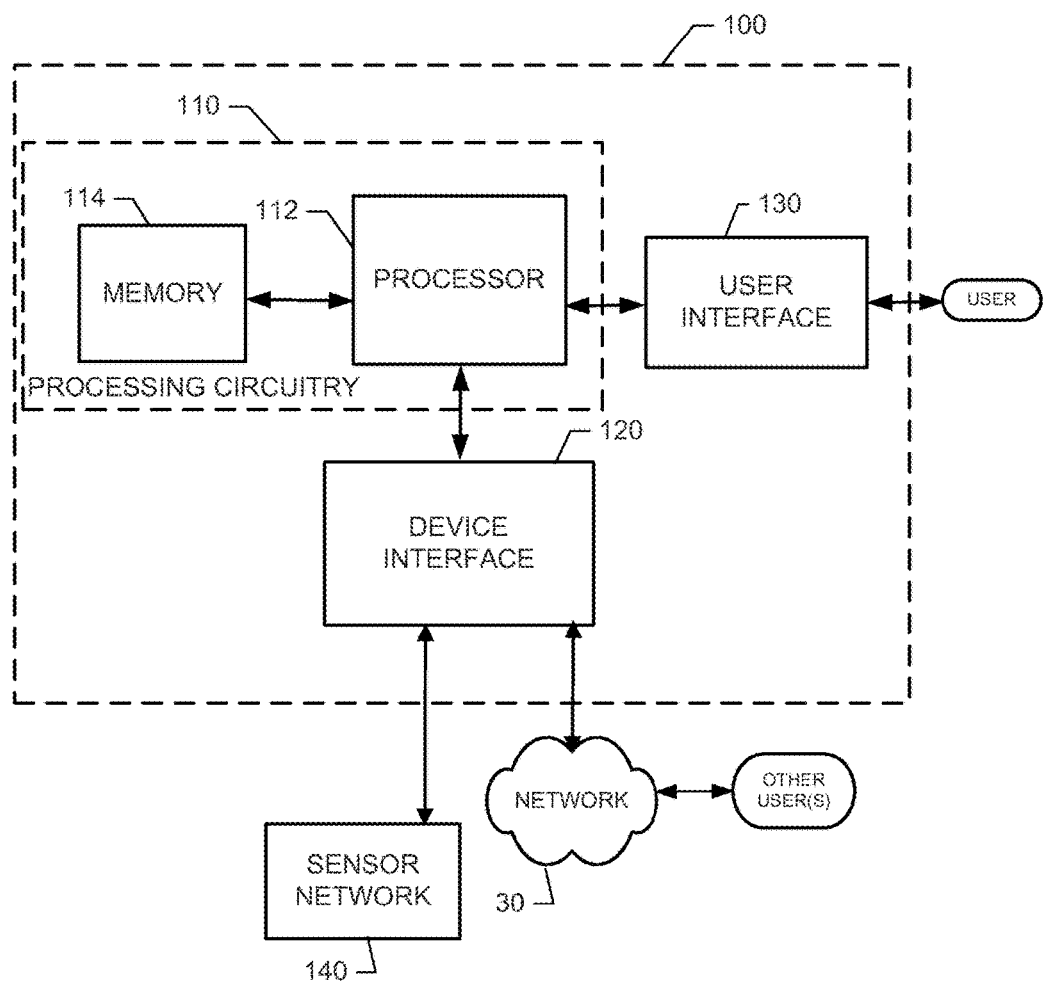
FIG. 2 illustrates a block diagram of one example of onboard electronics or monitoring circuitry that may be used in connection with employment of an example embodiment on power equipment that may employ an example embodiment.

The system 10 of FIG. 1 may support work pattern definition, detection and responses to detection on the basis of the execution of functionality that is executed using either or both of the onboard circuitry 22 and the monitoring circuitry 44. FIG. 2 illustrates a block diagram showing components that may be associated with embodiment of the onboard circuitry 22 and/or the monitoring circuitry 44 according to an example embodiment. As shown in FIG. 2, the onboard circuitry 22 and/or the monitoring circuitry 44 may include or otherwise be embodied as a outdoor power tool activity monitoring device 100. The outdoor power tool activity monitoring device 100 may include processing circuitry 110 of an example embodiment as described herein. In this regard, for example, the outdoor power tool activity monitoring device 100 may utilize the processing circuitry 110 to provide electronic control inputs to one or more functional units of the onboard circuitry 22 and/or the monitoring circuitry 44 and to process data generated by the one or more functional units regarding various indications of device activity (e.g., operational parameters and/or location information) relating to a corresponding one of the devices 20. In some cases, the processing circuitry 110 may be configured to perform data processing, control function execution and/or other processing and management services according to an example embodiment of the present invention. In some embodiments, the processing circuitry 110 may be embodied as a chip or chip set. In other words, the processing circuitry 110 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 110 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 110 may include one or more instances of a processor 112 and memory 114 that may be in communication with or otherwise control a device interface 120 and, in some cases, a user interface 130. As such, the processing circuitry 110 may be embodied as a circuit chip (e.g., an integrated circuit chip) configured (e.g., with hardware, software or a combination of hardware and software) to perform operations described herein. However, in some embodiments, the processing circuitry 110 may be embodied as a portion of an on-board computer on a device being monitored (e.g., one of the devices 20), while in other embodiments, the processing circuitry 110 may be embodied as a remote computer that monitors device activity for one or more devices.

The user interface 130 may be in communication with the processing circuitry 110 to receive an indication of a user input at the user interface 130 and/or to provide an audible, visual, tactile or other output to the user. As such, the user interface 130 may include, for example, a display, one or more levers, switches, buttons or keys (e.g., function buttons), and/or other input/output mechanisms. In an example embodiment, the user interface 130 may include one or a plurality of lights, a display, a speaker, a tone generator, a vibration unit and/or the like.

The device interface 120 may include one or more interface mechanisms for enabling communication with other devices (e.g., sensors of the sensor network 140 and/or other accessories or functional units of the outdoor power tool activity monitoring device 100 or other power equipment on which an example embodiment may be employed). In some cases, the device interface 120 may be any means such as a device or circuitry embodied in either hardware, or a combination of hardware and software that is configured to receive and/or transmit data from/to sensors in communication with the processing circuitry 110 via internal communication systems of the outdoor power tool activity monitoring device 100. In some cases, the device interface 120 may further include wireless communication equipment (e.g., a one way or two way radio) for at least communicating information from the outdoor power tool activity monitoring device 100 to a network and, in the case of a two way radio, in some cases receiving information from a network.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g., physically embodied in circuitry—in the form of processing circuitry 110) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform the operations described herein.

In an example embodiment, the processor 112 (or the processing circuitry 110) may be embodied as, include or otherwise control the operation of the outdoor power tool activity monitoring device 100 based on inputs received by the processing circuitry 110. As such, in some embodiments, the processor 112 (or the processing circuitry 110) may be said to cause each of the operations described in connection with the outdoor power tool activity monitoring device 100 in relation to operation the outdoor power tool activity monitoring device 100 relative to undertaking the corresponding functionalities associated therewith responsive to execution of instructions or algorithms configuring the processor 112 (or processing circuitry 110) accordingly.

In an exemplary embodiment, the memory 114 may include one or more non-transitory memory devices such as, for example, volatile and/or non-volatile memory that may be either fixed or removable. The memory 114 may be configured to store information, data, applications, instructions or the like for enabling the processing circuitry 110 to carry out various functions in accordance with exemplary embodiments of the present invention. For example, the memory 114 could be configured to buffer input data for processing by the processor 112. Additionally or alternatively, the memory 114 could be configured to store instructions for execution by the processor 112. As yet another alternative or additional capability, the memory 114 may include one or more databases that may store a variety of data sets responsive to input from the sensor network 140, the outdoor power tool activity monitoring device 100, or any other functional units that may be associated with the outdoor power tool activity monitoring device 100. Among the contents of the memory 114, applications may be stored for execution by the processor 112 in order to carry out the functionality associated with each respective application. In some cases, the applications may include instructions for recognition of patterns of activity and for initiation of one or more responses to the recognition of any particular pattern of activity as described herein. Additionally or alternatively, the applications may prescribe particular reporting paradigms or protocols for reporting of information from the outdoor power tool activity monitoring device 100 to a network device using the device interface 120.

In some embodiments, the processing circuitry 110 may communicate with electronic components and/or sensors of a sensor network 140 (e.g., sensors that measure variable values related to device operational parameters like RPM, temperature, oil pressure, seat presence, and/or the like, and/or sensors that measure device movement employing movement sensor circuitry) of the device 20 via the device interface 120. In one embodiment, sensors of the sensor network 140 of one or more ones of the devices 20 may communicate with the processing circuitry 110 of a remote monitoring computer via the network 30 and the device interface 120 using wireless communication or by downloading data that is transferred using a removable memory device that is first in communication with the device 20 to load data indicative of device activity, and is then (e.g., via the device interface 120) in communication with the remote monitoring computer (e.g., associated with the monitoring circuitry 44).

In some embodiments, the processing circuitry 110 may communicate with movement sensor circuitry of the device 20 (e.g., when the processing circuitry 110 is implemented as the onboard circuitry 22), or may receive information indicative of device location from movement sensor circuitry of one or more devices being monitored (e.g., when the processing circuitry is implemented as the monitoring circuitry 44). The movement sensor circuitry may include movement sensors (e.g., portions of the sensor network 140) such as one or more accelerometers and/or gyroscopes, or may include global positioning system (GPS) or other location determining equipment.

The movement sensor circuitry (if employed) may be configured to provide indications of movement of the device 20 based on data provided by the one or more accelerometers and/or gyroscopes, and/or based on GPS or local position determining capabilities. In other words, the movement sensor circuitry may be configured to detect movement of the device 20 based on inertia-related measurements or other location determining information. The indications may be provided to the activity monitoring device 100 along with or instead of operation parameter data to enable the activity monitoring device 100 to select instruction sets for initiation in response to a determination that a predefined work pattern is detected. In some embodiments, the movement sensor circuitry may utilize a carrier wave signal (e.g., the carrier associated with GPS satellite transmissions) in order to employ real time kinematic (RTK) satellite navigation techniques. RTK-GPS may employ phase measurements of the carrier wave (without regard for the content of such signals) in order to improve the accuracy of GPS positioning by employing carrier-phase enhancement.

In an example embodiment, the processing circuitry 110 may be configured to receive the indications of device activity (e.g., in the form of information descriptive of operational parameters and/or location information associated with the device 20) and determine if the device activity correlated to a predefined work pattern. Thus, for example, the memory 114 may store a plurality of different work patterns that may include certain activities, and in some cases also the order in which the activities are performed. The activities may also define specific time limitations or windows that are met to qualify an activity for correspondence with a work pattern and/or with a component of a work pattern. However, in some cases, although time may also be recorded in association with an activity, the time may not be a qualifying criteria, but may instead be an operational parameter to be reported to enable invoicing or time based charges to be assessed as appropriate. When indications of device activity are received by the processing circuitry 110, the processing circuitry 110 may be configured to compare the indications to the work patterns stored in memory 114 to determine if there is a correspondence therebetween.

In some cases, for example, each predefined work pattern may include specific activities and corresponding parametric and/or location criteria associated therewith. The parametric criteria may include parametric values, the order in which the values are experienced and the time during which the values were experienced. The location criteria may include specific locations, movements, and/or combinations thereof. In some cases, a margin of error may be associated with one or more of the values, locations, movements and/or the like. Thus, the processing circuitry 110 may compare the indications of device activity to the parametric and/or location criteria associated with each predefined work pattern and, if the indications of device activity fall within the margin of error for each activity, a correlation may be made between the device activity and the predefined work pattern. If certain device activity matches multiple work patterns, the device activity may be correlated with the work pattern for which the least cumulative error is experienced. Additionally or alternatively, a threshold amount of error relative to differences between device activity and work patterns may be defined for at least some work patterns. Thus, if the device activity is within the threshold amount of error from the work pattern, a correlation may be made therebetween by the processing circuitry 110.

In an example embodiment, each predefined work pattern may also be associated with an instruction set that may be provided to initiate a response to detection of the corresponding predefined work pattern. The instruction sets may define instructions for execution by a device to perform alerting, reporting, prescriptive activities or protective activities. Thus, for example, the instruction sets may define instructions for providing warnings locally at the device being monitored or at a remote monitoring location. For example, if the work pattern is indicative of a situation that merits a local warning or merits informing a work coordinator, supervisor, or remote monitoring entity, an alarm or warning may be instructed. Alternatively or additionally, the work pattern may indicate that an alert or warning is to be provided to an operations center. The operations center may then undertake to initiate appropriate actions.

In some embodiments, the instruction sets may define instructions for shutdown of the device being monitored rather than, or in addition to the provision of an alert or warning. For example, if the work pattern is an undesirable work pattern (e.g., due to danger, inefficiency, or unauthorized activity being associated with the pattern of activity), the device being monitored may be shutdown via execution of the instruction set. As one example, the movement of the device may indicate that the operator is slowly slipping and thus a shutdown (and/or warning) may be initiated before the operator rapidly slips or falls. As another example, an operator may move to an area in which work is not authorized. In such a situation, a shutdown (and/or warning) may be provided so that the operator does not work in the unauthorized area.

In still other examples, the work pattern may identify a situation that has been identified as an exceptional situation relative to some other normal warning or shutdown condition. For example, a work pattern may be detected that would otherwise cause a shutdown or warning condition. However, due to the execution of the instruction set, the shutdown or warning condition may be bypassed or averted. As an example, a shutdown may be initiated based on default settings, but the operator may perform pattern analysis to define a work pattern for which no shutdown should occur so that the next time the work pattern is experienced, there will be no shutdown. In some embodiments, the work pattern may be associated with the identity of the operator and/or the experience level of the operator. Thus, for example, an experienced operator may have certain work patterns that enable shutdown or warning conditions to be avoided, whereas an inexperienced operator would have the corresponding equipment shutdown, or a warning issued. As such, the work patterns and corresponding level of matching, and/or prescriptive instructions associated with warning/shutdown may be dependent upon the level of experience of the user (e.g., expert, beginner, or levels in between).

In still other embodiments, prescriptive activities may be associated with or directed by the instruction sets. For example, when a particular work pattern is experienced, a signal may be sent to another device to direct the device to perform a particular activity. As an example, one device 20 may be a chainsaw. The location, movement and/or operational parameters associated with the chainsaw may indicate a pattern corresponding to a work pattern associated with an activity history of the chainsaw having just cut down a tree and cut it into sections. The work pattern may be identified at the device 20, or at the application server 40. In either case, the network 30 may be utilized to provide prescriptive instructions to another device (e.g., loading equipment) to proceed to the location of the chainsaw at the time of the activity in order to load the sectioned logs. Prescriptive instructions could also be provided to the device 20 that originally performed the activity, or to any other type of device that is capable of communication with the network 30. Furthermore, the prescriptive instructions could be provided based on real time or post hoc information.

In some embodiments, reporting activities may be associated with or directed by the instruction sets. For example, upon completion of a job as indicated by a work pattern, details about the job may be reported so that, for example, invoicing may be accomplished for the job. Numerous other types of reports may also be initiated based on recognition of a work pattern (e.g., maintenance reports, run time reports, efficiency reports, and/or the like.)

As suggested above, operators may define work patterns in some cases. Thus, for example, the operator may perform a task and the activities associated with the performance of the task may be monitored and/or recorded. The operator may then, at some later time, define the activities associated with the performance of the task as a work pattern. The operator may then associate an instruction set with the work pattern defined. The instruction set may be created by the operator, or may be selected from a list of available instruction sets. The work patterns and/or instruction sets may also be made to be operator specific, or operator-type specific. Thus, specific instruction sets could be defined for initiation for specific operators or types of operators (e.g., novice, experienced, etc.) when a work pattern is detected in association with activity of the operator or type of operator.

In some embodiments, the processing circuitry 110 may also be configured to enable automated pattern learning. In this regard, for example, if a shutdown is continually triggered based on a specific work pattern being executed, the processing circuitry 110 may be configured to correlate a warning action with the work pattern to attempt to preempt further shutdowns by warning the operator that a shutdown is likely imminent. In some embodiments, the occurrence of certain trigger events such as, for example, a shutdown, may cause the processing circuitry 110 to evaluate conditions surrounding the trigger event to determine if a pattern of activity can be correlated to the trigger event. The occurrence of the same pattern of activity at least a threshold number of times may enable the processing circuitry 110 to correlate the pattern of activity to a work pattern and associate a give set of instructions for, in this case, issuing a warning. The ability to learn work patterns may therefore define a teaching mode or self instruction mode where the user (perhaps based on an authorization level associated with user experience) can override certain warnings or protective functions to teach the device that a certain work pattern is acceptable so that no warning or protective function will be issued the next time the work pattern is experienced.

Accordingly, in response to the device activity correlating to a predefined work pattern, the processing circuitry 110 of example embodiments may be configured to determine a set of instructions associated with the predefined work pattern. The work pattern and/or the set of instructions may be associated with a specific location for either or both of qualification criteria for initiation of instruction set provision (i.e., as part of the work pattern), or as part of the instruction set (e.g., instruction to proceed to a specific location).

Figure 3:
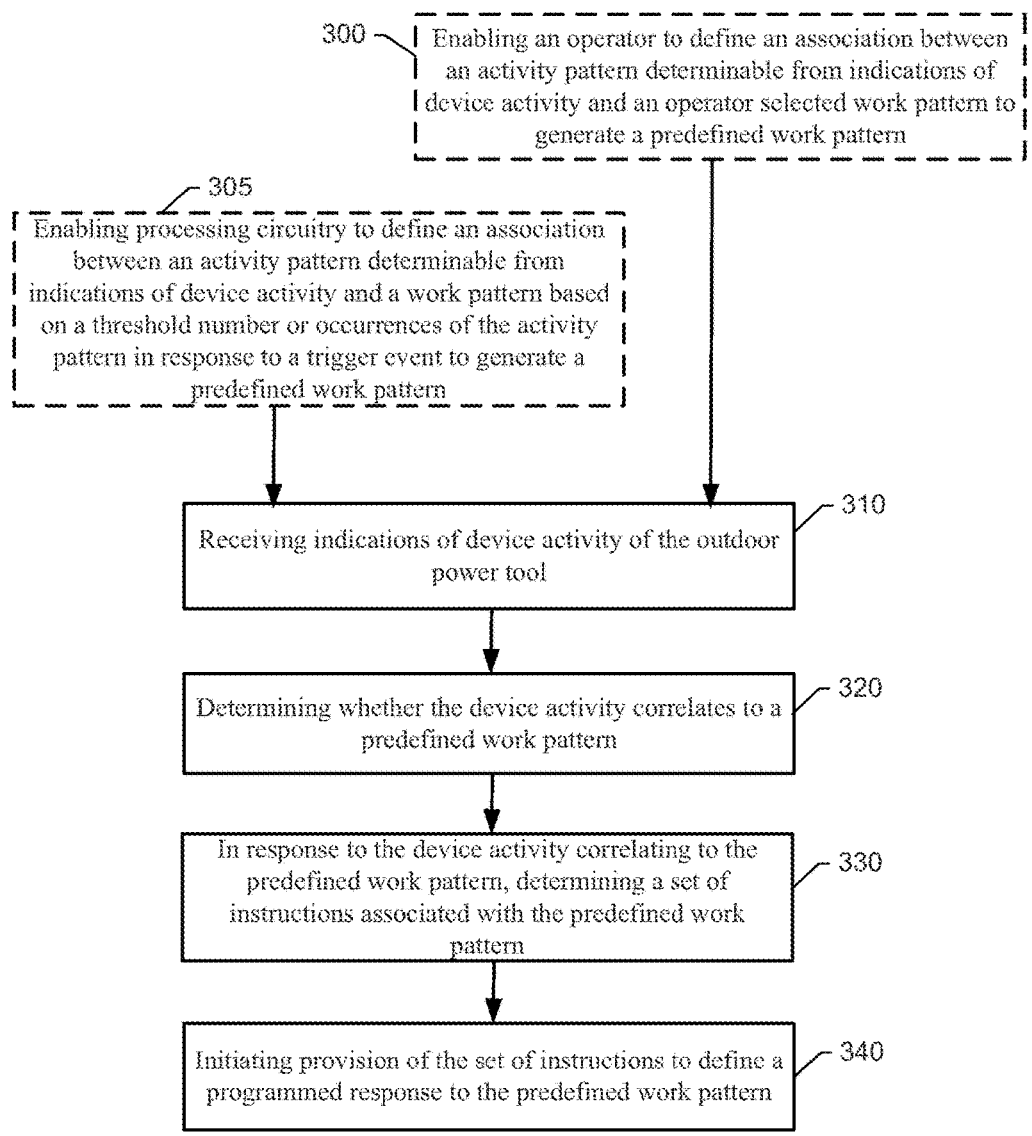
FIG. 3 illustrates a method of utilizing work pattern analysis in relation to operation of an outdoor power tool according to an example embodiment.

In some cases, a method of utilizing work pattern analysis in relation to operation of an outdoor power tool according to an example embodiment may be provided. FIG. 3 illustrates a block diagram of some activities that may be associated with one example of such a method. In some embodiments, the processing circuitry 110 (which may include a processor capable of executing instructions stored in a non-transitory computer readable medium/memory) may be configured to implement a control algorithm for the outdoor power tool according to the method.

In an example embodiment, the method may include receiving indications of device activity of the outdoor power tool at operation 310, determining whether the device activity correlates to a predefined work pattern at operation 320, determining a set of instructions associated with the predefined work pattern in response to the device activity correlating to the predefined work pattern at operation 330, and initiating provision of the set of instructions to define a programmed response to the predefined work pattern at operation 340.

In some embodiments, the method may include additional, optional operations, and/or the operations described above may be modified or augmented. Some examples of modifications, optional operations and augmentations are described below. In this regard, for example, in some cases, (1) receiving the indications of device activity may include receiving the indications remotely at a computing device or locally at the device. When the indications are received remotely, (2) the indications may be received wirelessly or via uploading of data from a removable memory device to transfer the data from an outdoor power tool to the computing device. Additionally or alternatively, (3) receiving indications of device activity may include receiving the indications in real time or receiving the indications as an event history. In some embodiments, (4) determining whether the device activity correlates to the predefined work pattern may include comparing the device activity to a plurality of work patterns, each of which is indicative of a series of activities identifiable based on operational parameters associated with operation of the device and correlating the device activity to the predefined work pattern in response to a threshold level of matching between the device activity and the predefined work pattern. In some embodiments, (5) determining whether the device activity correlates to the predefined work pattern may include comparing the device activity to a plurality of work patterns, each of which is indicative of a series of activities identifiable based on location information associated with operation of the device and correlating the device activity to the predefined work pattern in response to a threshold level of matching between the device activity and the predefined work pattern. Meanwhile, in some embodiments, (6) determining whether the device activity correlates to the predefined work pattern may include comparing the device activity to a plurality of work patterns, each of which is indicative of a series of activities identifiable based on a combination of operational parameters and location information associated with operation of the device and correlating the device activity to the predefined work pattern in response to a threshold level of matching between the device activity and the predefined work pattern. In an example embodiment, (7) determining the set of instructions associated with the predefined work pattern may include determining a protective function to be initiated at an outdoor power tool or at a remote monitoring device in response to the device activity correlating to the predefined work pattern. The protective function may be a warning or a shutdown.

In some embodiments, any or all of (1) to (7) may be employed and determining the set of instructions associated with the predefined work pattern may include determining a related function (e.g., as a prescriptive set of instructions) to be initiated at the device or at an outdoor power tool other than the outdoor power tool providing the indications of device activity in response to the device activity correlating to the predefined work pattern. In an example embodiment, any or all of (1) to (7) may be employed and initiating provision of the set of instructions may include providing the set of instructions wirelessly in real time or providing the set of instructions via transfer of the set of instructions from a removable memory device. Additionally or alternatively, any or all of (1) to (7) may be employed and initiating provision of the set of instructions may include providing the set of instructions to the device being monitored, or to a device other than the device being monitored. In an example embodiment, any or all of (1) to (7) may be employed and determining the set of instructions may include determining the set of instructions based on an experience level rating of an operator associated with the device being monitored. Additionally or alternatively, any or all of (1) to (7) may be employed and the method may further include an initial operation including enabling an operator to define an association between an activity pattern determinable from the indications of device activity and an operator selected work pattern to generate the predefined work pattern at operation 300. Operation 300 is shown in dashed lines in FIG. 3 to highlight the fact that it may be optional. As an alternative to operation 300, some embodiments may include optional operation 305, which may include enabling the processing circuitry to define an association between an activity pattern determinable from the indications of device activity and a work pattern based on a threshold number or occurrences of the activity pattern in response to a trigger event to generate the predefined work pattern.

In an example embodiment, an outdoor power tool or a network device may be provided with processing circuitry configuring the corresponding tool or device to perform example embodiments as described herein. The outdoor power tool may include an engine, a working assembly that performs a cutting operation powered by the engine, and processing circuitry as defined herein. Generally speaking, some example embodiments may provide a safety function via which is a work pattern is detected that does not match a predefined patter, the tool is either shut down or a warning is issued.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An outdoor power tool activity monitoring device comprising processing circuitry configured to:
   receive indications of device activity of the outdoor power tool, wherein the outdoor power tool is a mobile, handheld outdoor power tool, and wherein receiving the indications of device activity comprises receiving movement information;
   determine whether the device activity correlates to a predefined work pattern;
   in response to the device activity correlating to the predefined work pattern, determine a set of instructions associated with the predefined work pattern; and
   initiate provision of the set of instructions to define a programmed response to the predefined work pattern.

2. The device of claim 1, wherein receiving the indications of device activity comprises receiving the indications locally at the device or remotely at a computing device.

3. The device of claim 2, wherein receiving the indications remotely comprises receiving the indications wirelessly or via uploading of data from a removable memory device to transfer the data from the outdoor power tool to the computing device.

4. The device of claim 1, wherein the movement information is associated with operation of the tool by an operator.

5. The device of claim 1, wherein the predefined work pattern is associated with an identity of an operator of the tool or an experience level of the operator.

6. The device of claim 1, wherein receiving the indications of device activity comprises receiving the indications in real time.

7. The device of claim 1, wherein receiving the indications of device activity comprises receiving the indications as an event history.

8. The device of claim 1, wherein determining whether the device activity correlates to the predefined work pattern comprises comparing the device activity to a plurality of work patterns, each of which is indicative of a series of activities identifiable based on operational parameters associated with operation of the device and correlating the device activity to the predefined work pattern in response to a threshold level of matching between the device activity and the predefined work pattern.

9. The device of claim 1, wherein determining whether the device activity correlates to the predefined work pattern comprises comparing the device activity to a plurality of work patterns, each of which is indicative of a series of activities identifiable based on location information associated with operation of the device and correlating the device activity to the predefined work pattern in response to a threshold level of matching between the device activity and the predefined work pattern.

10. The device of claim 1, wherein determining whether the device activity correlates to the predefined work pattern comprises comparing the device activity to a plurality of work patterns, each of which is indicative of a series of activities identifiable based on a combination of operational parameters and location information associated with operation of the device and correlating the device activity to the predefined work pattern in response to a threshold level of matching between the device activity and the predefined work pattern.

11. The device of claim 1, wherein determining the set of instructions associated with the predefined work pattern comprises:
   determining a protective function to be initiated at the tool in response to the device activity correlating to the predefined work pattern, or
   determining a protective function to be initiated at a remote monitoring device in response to the device activity correlating to the predefined work pattern.

12. The device of claim 11, wherein determining the protective function to be initiated comprises determining whether to provide a warning or initiate a shutdown.

13. The device of claim 1, wherein determining the set of instructions associated with the predefined work pattern comprises determining a related function to be initiated at an tool other than the tool providing the indications of device activity.

14. The device of claim 1, wherein initiating provision of the set of instructions comprises providing the set of instructions wirelessly in real time or providing the set of instructions via transfer of the set of instructions from a removable memory device.

15. The device of claim 1, wherein initiating provision of the set of instructions comprises providing the set of instructions to the device being monitored, or to a device other than the device being monitored.

16. The device of claim 1, wherein the processing circuitry is further configured to enable an operator to define an association between an activity pattern determinable from the indications of device activity and an operator selected work pattern to generate the predefined work pattern.

17. The device of claim 1, wherein the processing circuitry is further configured to define an association between an activity pattern determinable from the indications of device activity and a work pattern based on a threshold number of occurrences of the activity pattern in response to a trigger event to generate the predefined work pattern.

18. The device of claim 1, wherein determining the set of instructions comprises determining the set of instructions based on an experience level rating of an operator associated with the device being monitored.

19. The device of claim 1, wherein receiving the indications of device activity comprises receiving the movement information based on utilizing one or more of: a movement sensor; a movement detector; and real time kinematic (RTK)—global position system (GPS) navigation to determine the movement information.

20. A method of utilizing work pattern analysis in relation to operation of an outdoor power tool, the method comprising:
- receiving indications of device activity of the outdoor power tool, wherein the outdoor power tool is a mobile, handheld outdoor power tool, and wherein receiving the indications of device activity comprises receiving movement information;
- determining, via processing circuitry, whether the device activity correlates to a predefined work pattern;
- in response to the device activity correlating to the predefined work pattern, determining a set of instructions associated with the predefined work pattern; and
- initiating provision of the set of instructions to define a programmed response to the predefined work pattern.

* * * * *